(12) United States Patent
Shirai et al.

(10) Patent No.: US 6,402,381 B1
(45) Date of Patent: Jun. 11, 2002

(54) RELATIVE LINEAR MOTION APPARATUS

(75) Inventors: Takeki Shirai; Tadashi Hirokawa; Akihiro Teramachi, all of Tokyo-to (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/625,966

(22) Filed: Jul. 26, 2000

(30) Foreign Application Priority Data

Jul. 29, 1999 (JP) ............................................ 11-215794
Jun. 5, 2000 (JP) ....................................... 2000-167616

(51) Int. Cl.⁷ ............................................... F16C 29/06
(52) U.S. Cl. ........................................... 384/45; 384/57
(58) Field of Search ............................... 384/43, 45, 57, 384/37, 38

(56) References Cited

U.S. PATENT DOCUMENTS 2,672,379 A * 3/1954 McVey ........................ 384/45
4,231,621 A * 11/1980 Teramachi .................... 384/45
5,388,913 A * 2/1995 Cawley et al. ............. 384/57 X
5,706,581 A * 1/1998 Kato et al. ................. 384/45 X
6,019,514 A * 2/2000 Feinstein ..................... 384/37

FOREIGN PATENT DOCUMENTS

DE       3834900      *  4/1990  .................. 384/57

* cited by examiner

Primary Examiner—Thomas R. Hannon
(74) Attorney, Agent, or Firm—Armstrong, Westerman & Hattori, LLP (57) ABSTRACT

A relative linear motion apparatus comprising: a first structure having at least a pair of inner wall surfaces opposing to each other; a second structure arranged between the pair of inner wall surfaces, the second structure being movable in linear motion relative to the first structure; at least two rectilinear guides arranged between the first structure and the second structure; and a displacement absorbing device arranged on at least one of the first structure and the second structure so as to allow at least one of the two rectilinear guides to move in a intersecting direction against the wall surfaces.

15 Claims, 13 Drawing Sheets

RELATIVE LINEAR MOTION APPARATUS

BACKGROUND OF THE INVENTION

The present invention relates to a relative linear motion apparatus in which a second structure is movable in linear motion relative to a first structure, for example in which the second structure formed like a plate is put in the first structure formed like a frame, plurality of rectilinear guides are arranged between the first structure and the second structure so that the second structure is movable relative to the first structure.

Figure 15:
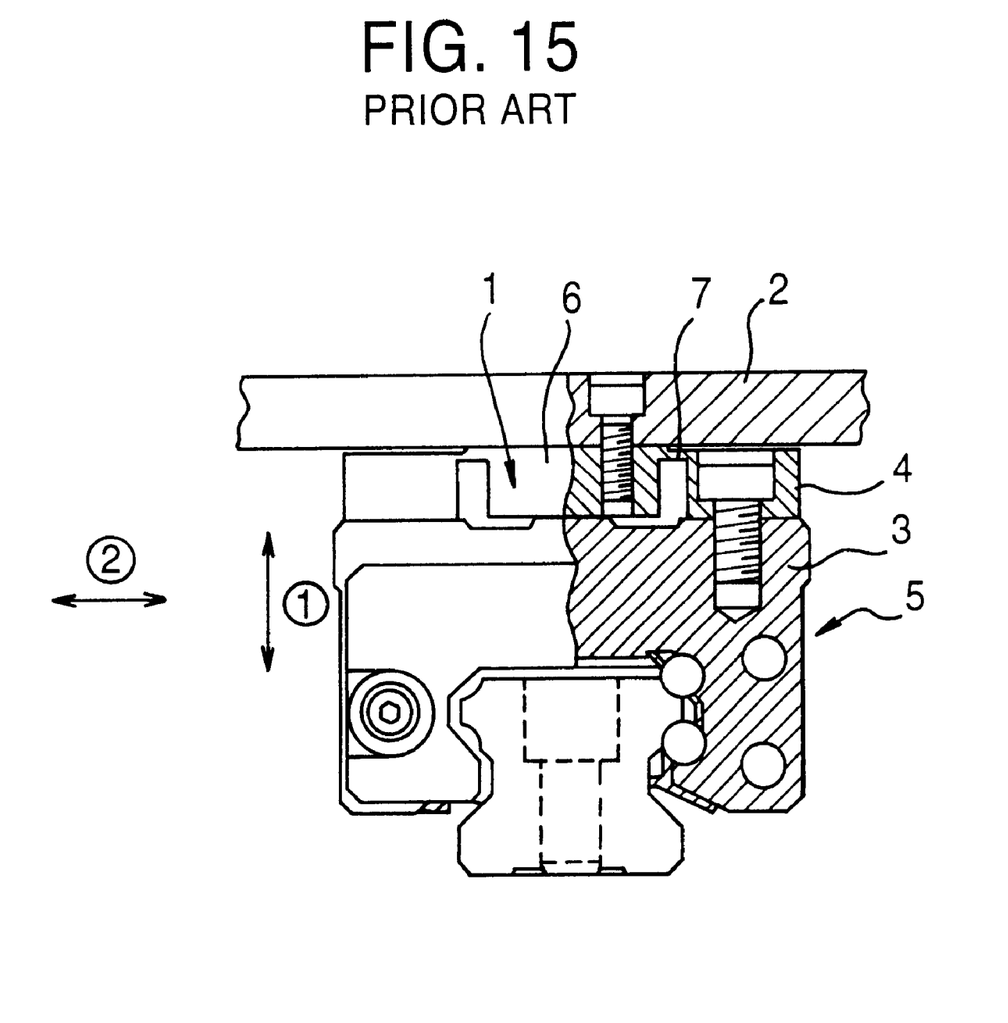
FIG. 15 is a plan view, partially in section, of a mounting plate having a conventional structure.

In a known art, the Japanese Patent Laid-open Publication No. HEI 7-190053 discloses a mounting plate for a rectilinear guide in order to allow misalignment such as an installation error caused when rectilinear guide is installed. FIG. 15 shows this mounting plate. The mounting plate 1 is put between the rectilinear guide 5 and a fixed member 2, and allows the rectilinear guide 5 to move in a perpendicular direction ① against the fixed member 2. The mounting plate 1 consists of fixed portion 6 mounted to the fixed member 2, attached portion 4 mounted to a movable block 3 of the rectilinear guide 5, and thin board portion 7 which connect the fixed portion 6 with the attached portion 4.

Since the misalignment such as the installation error deforms the thin board portion 7, the attached portion 4 moves relative to the fixed portion 6 in the perpendicular direction ① and the mounting plate 1 absorbs the misalignment.

SUMMARY OF THE INVENTION

In some cases, a relative linear motion apparatus comprises a fixed member (first structure) having at least a pair of inner wall surfaces opposing to each other, a movable member (second structure) arranged between the pair of inner wall surfaces, two rectilinear guides arranged between the fixed member and the movable member. The movable member guided by the rectilinear guides slides relative to the fixed member in linear motion to a direction parallel to the inner wall surfaces of the fixed member.

In such a relative linear motion apparatus, when the parallelism of one rectilinear guide to the other rectilinear guide is spoiled by an installation error, or when installing position for the rectilinear guide is under slight error, the movable member can not slide smoothly. Therefore it is necessary to install the rectilinear guides with high accuracy. Also, even if the rectilinear guides are installed with high accuracy, since the rectilinear guides are applied a load caused by thermal expansion and contraction difference between the fixed member and the movable member in a perpendicular direction to the wall, the movable member sometimes can not slide smoothly In case the conventional mounting plate 1 is used for the relative linear motion apparatus described above, deformation of the thin board portion 7 is small and the mounting plate 1 can not absorb a large error. Therefore, though the mounting plate 1 can absorb small misalignment, the mounting plate 1 can not sufficiently absorb thermal expansion and contraction difference between the fixed member and the movable member.

Also the conventional mounting plate 1 allows the movable member to move slightly not only in the perpendicular direction ① but also in a horizontal direction ② (which is parallel to the inner wall surface and perpendicular to a sliding direction of the movable member). So the movable member can not be guided with good rigidity. Further, it is difficult to process the thin board portion 7 on the mounting plate 1.

An object of the present invention is to provide a relative linear motion apparatus which can sufficiently absorb the installing error of rectilinear guides or thermal expansion and contraction difference between the fixed member and the movable member, and guide the movable member with good rigidity.

In order to achieve the above-mentioned object, the relative linear motion apparatus according to the present invention is constructed so as to comprise: a first structure having at least a pair of inner wall surfaces opposing to each other; a second structure arranged between the pair of inner wall surfaces, the second structure being movable in linear motion relative to the first structure; at least two rectilinear guides arranged between the first structure and the second structure; and a displacement absorbing device arranged on at least one of the first structure and the second structure so as to allow at least one of the two rectilinear guides to move in a intersecting direction against the wall surfaces. The two rectilinear guides make the second structure to be movable in linear motion relative to the first structure.

When the second structure is arranged between the pair of inner wall surfaces of the first structure through the rectilinear guides, and a processing error including an installation error or thermal expansion and contraction difference between the first structure and the second structure occurs, the second structure could not smoothly slide relative to the first structure.

According to the invention described above, even if the processing error including the installation error occurs, or even if the thermal expansion and contraction difference occurs, the displacement absorbing device can absorb the displacement of the rectilinear guide in the intersecting direction against the wall surfaces. Therefore the rectilinear guides are not applied an excessive load and work smoothly, and the second structure smoothly slide relative to the first structure. If the displacement absorbing device allows at least one of the two rectilinear guides to move only in the intersecting direction against the wall surfaces (for example only in the perpendicular direction to the wall surfaces), and restricts the rectilinear guide to move in a horizontal direction (which is parallel to the inner wall surface and perpendicular to a sliding direction of the second structure), it is possible to guide the second structure with good rigidity.

In the relative linear motion apparatus to which the present invention is applied, at least one of the two rectilinear guides moves in the intersecting direction against the wall surfaces due to a processing error including an installation error caused when said at least one of the two rectilinear guides is installed or thermal expansion or thermal contraction difference between the first structure and the second structure.

The relative linear motion apparatus of the invention is effective in absorbing such large displacement.

In a preferred embodiment of the present invention, the displacement absorbing device is arranged between (i) one of said first structure and said second structure and (ii) one of said two rectilinear guides, said displacement absorbing device having an elastic beam which can deflect toward the intersecting direction against the wall surfaces.

According to this embodiment, an elastic beam can deflect and absorb the processing error or the thermal expansion and contraction difference between the first structure and the second structure.

In a further embodiment, said elastic beam has span which is capable of deflection, and the span is longer than width of said one of the two rectilinear guides.

According to this embodiment, the span of the elastic beam become longer, and the deflection of the elastic beam become larger. Therefore the elastic beam can absorb the large processing error or the large thermal expansion and contraction difference.

In a further embodiment, a spacer is arranged between said elastic beam and said one of the two rectilinear guides so that said elastic beam deflects larger, the spacer having width less than the width of said one of the two rectilinear guides.

According to this embodiment, since the load placed on the elastic beam approaches to concentrated load from distributed load, the elastic beam deflects larger.

In a further embodiment, said elastic beam has both longitudinal end portions fixed to said first structure or said second structure, and said one of the two rectilinear guides is arranged in the middle of said elastic beam in a longitudinal direction thereof.

According to this embodiment, the elastic beam deflects with easy construction.

In a further embodiment, said first structure or said second structure has guide surfaces which guide said one of the two rectilinear guides to move in the intersecting direction against the wall surfaces.

According to this embodiment, since the rectilinear guide is guided to move in the intersecting direction against the wall surfaces, the rectilinear guide is prevented from moving in another direction except the intersecting direction. For example it is possible for the rectilinear guide to move only in the perpendicular direction to the wall surfaces so as to absorb the error and not to move in the horizontal direction. Therefore the second structure can be guided with good rigidity.

In a further embodiment, said guide surfaces allows said one of the two rectilinear guides to move only in a perpendicular direction to the wall surfaces without occurrence of change in posture thereof.

According to this embodiment, the rectilinear guide is allowed to move only in the perpendicular direction to the wall surfaces, and is restricted to move in the horizontal direction.

In a further embodiment, each of said rectilinear guides comprises:

a track member formed with a rolling member rolling surface along a longitudinal direction;

a movable block mounted to be relatively movable to the track member formed with a rolling member circulation passage including a loaded rolling member rolling surface opposing to the rolling member rolling surface of the track member when mounted;

and a number of rolling members arranged in the rolling member circulation passage so as to circulate therein in conformity with the relative motion of the movable block with respect to the track rail.

In a further embodiment, each of movable blocks is fixed to said each of said inner wall surfaces of said first structure, and each of track members is fixed to each of edges of said second structure.

In a further embodiment, said track member is integrally formed with said second structure by an inserting mold.

In case the second structure is arranged between the pair of the inner wall surfaces of the first structure through the rectilinear guides, it is necessary to reduce the processing error including the installation error so that the second structure smoothly slides relative to the first structure.

According to this embodiment, since the track rail is inserted in second structure and is integrally molded with the second structure, the processing error is reduced as small as possible. Also, since component parts are reduced too, a relative linear motion apparatus of the invention can be fitted for mass production. On the contrary, if the track rail and the second structure are separately made and the track rail and the second structure are joined together with bolts and so on, the occurrence of the installing error caused by the operator's degree of aging can not be avoided.

BRIEF DESCRIPTION OF THE DRAWINGS

In the accompanying drawings:

FIG. 14 is a cross sectional view showing another variations of the point of apparatus in FIG. 11, and includes FIG. 14A showing a first variation, FIG. 14B showing a second variation, FIG. 14(C) showing a third variation.

DESCRIPTION OF THE PREFERRED EMBODIMENTS

FIGS. 1 to 4 respectively show a relative linear motion apparatus according to a first embodiment of the present invention.

Figure 1:
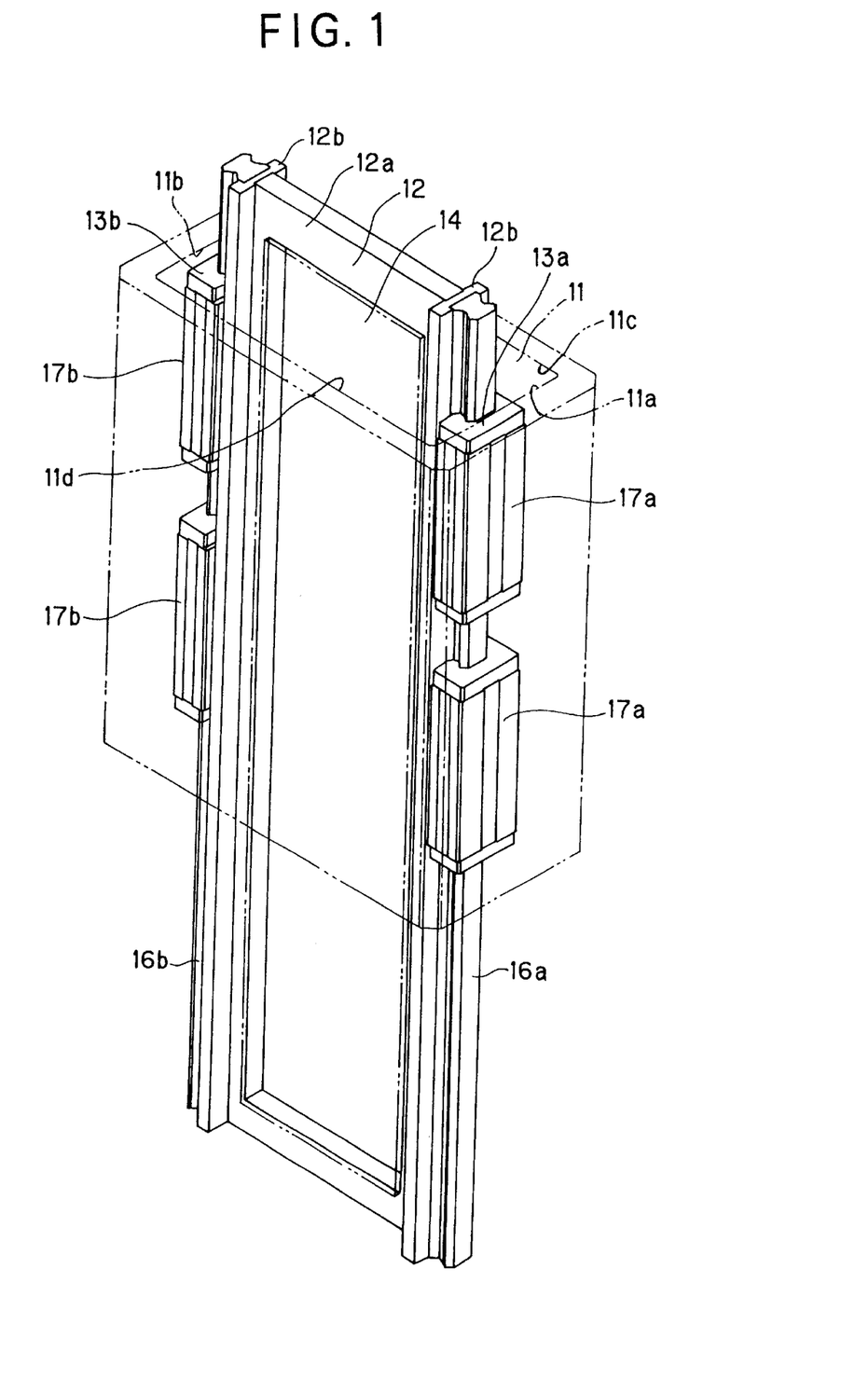
FIG. 1 is a perspective view showing a relative linear motion apparatus according to a first embodiment of the present invention.

As shown in FIG. 1, This relative linear motion apparatus comprises a fixed member 11 formed like a quadrilateral frame as first structure, movable member 12 (a second structure) arranged between a pair of inner wall surfaces 11a, 11b in short sides of the quadrilateral frame, movable member 12 being formed like a plate, and a pair of rectilinear guides 13a, 13b arranged between each of the inner wall surfaces 11a, 11b and each of both edges of the movable member 12. The inner wall surfaces 11a, 11b are parallel to each other. The movable member 12 arranged between the pair of inner wall surfaces 11a, 11b is perpendicular to the pair of inner wall surfaces 11a, 11b. Also the movable member 12 slides relative to the inner wall surfaces 11a 11b in a direction parallel to the inner wall surfaces 11a 11b.

Figure 4:
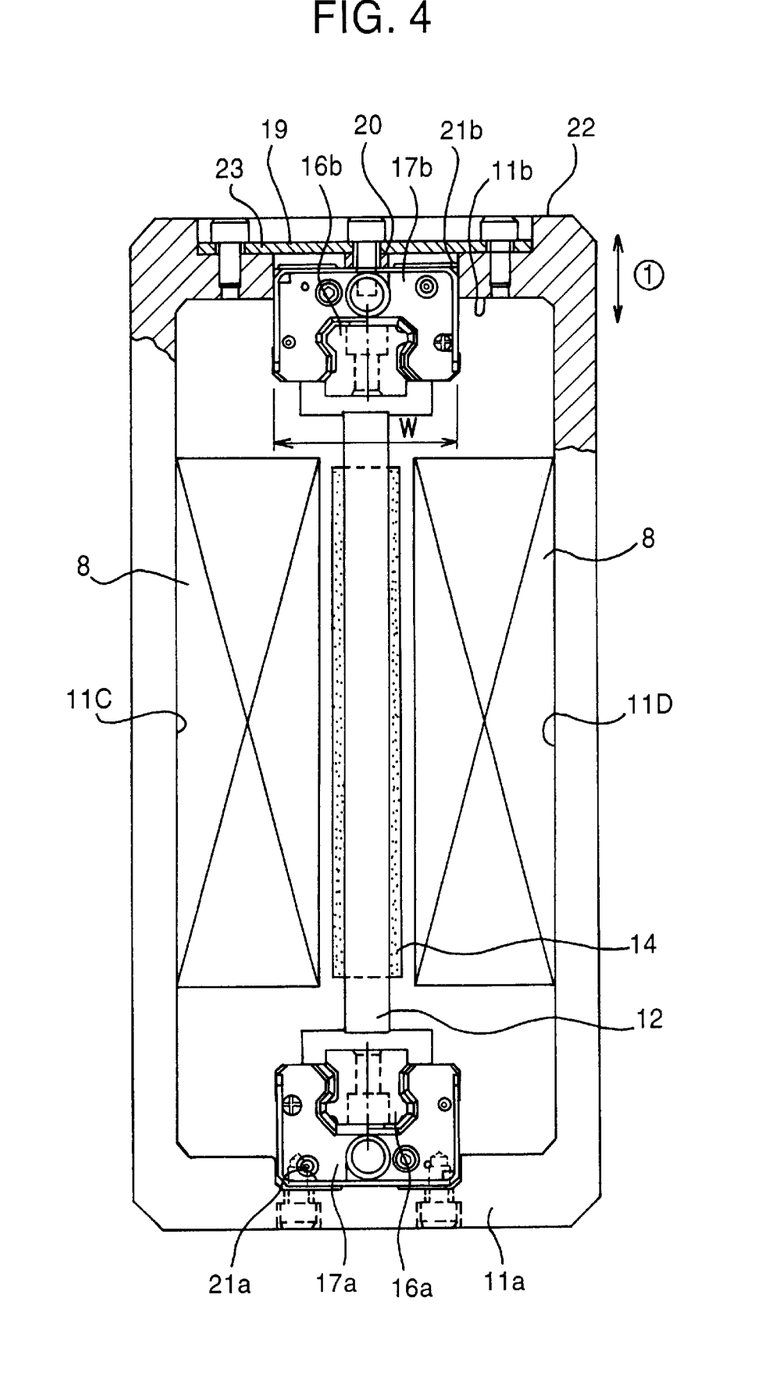
FIG. 4 is a plan view of the apparatus of FIG. 2 taken along the line IV—IV therein, partially in section.

This relative linear motion apparatus is used for a linear motor for example. In this case, as shown in FIG. 4 a permanent magnet 14 as a magnetic material is disposed in a frame of the movable member 12. And a pair of coils 8, 8 are disposed on a pair of inner wall surfaces 11c 11d in long sides of the fixed member 11. And the movable member 12 is put between the pair of coils 8, 8. Producing a magnetic field of the coils 8, 8 slides the movable member 12.

The movable member 12 is composed of a frame 12a, the permanent magnet 14 disposed in the frame 12a, and rail holding portions 12b, 12b which are fixed to both edges of the frame 12a. Track rails 16a, 16b are attached to the rail holding portions 12b, 12b. This movable member 12 slides in a direction parallel to the inner wall surfaces 11a 11b (in FIG. 1 vertical direction) with the track rails 16a, 16b.

Each of the rectilinear guides 13a, 13b comprises the track rail 16a (16b) as a track member, and the movable block 17a (17b) as slide member. In this embodiment, two movable blocks 17a, 17a (17b, 17b) are put side by side on the track rail 16a (16b). Each of the track rails 16a, 16b is arranged on each of both edges of the movable member 12. And the movable blocks 17a, 17a, 17b, 17b are arranged on the inner wall surfaces 11a, 11b of fixed member 11. The track rails 16a, 16b slide along the movable blocks 17a, 17a, 17b, 17b without changing the position of the movable blocks 17a, 17a, 17b, 17b.

In this embodiment, although the backs of the movable blocks 17a, 17a, 17b, 17b are attached to the inner wall surfaces 11a, 11b and the movable member 12 is arranged between the track rails 16a, 16b opposing to each other, the arrangement of the rectilinear guides 13a, 13b is not restricted to these. For example, it may be possible to turn the rectilinear guides 13a, 13b over so that the backs of the movable blocks 17a, 17b are attached to the both edges of the movable member 12 and the track rails 16a, 16b are attached to the inner wall surfaces 11a, 11b. Also it may be possible to turn only one of the rectilinear guides 13a, 13b over. In this case, the track rail 16b is attached to the inner wall surface 11b in one rectilinear guide 13b and the back of movable block 17a is attached to the inner wall surface 11a in other rectilinear guide 13a.

Figure 2:
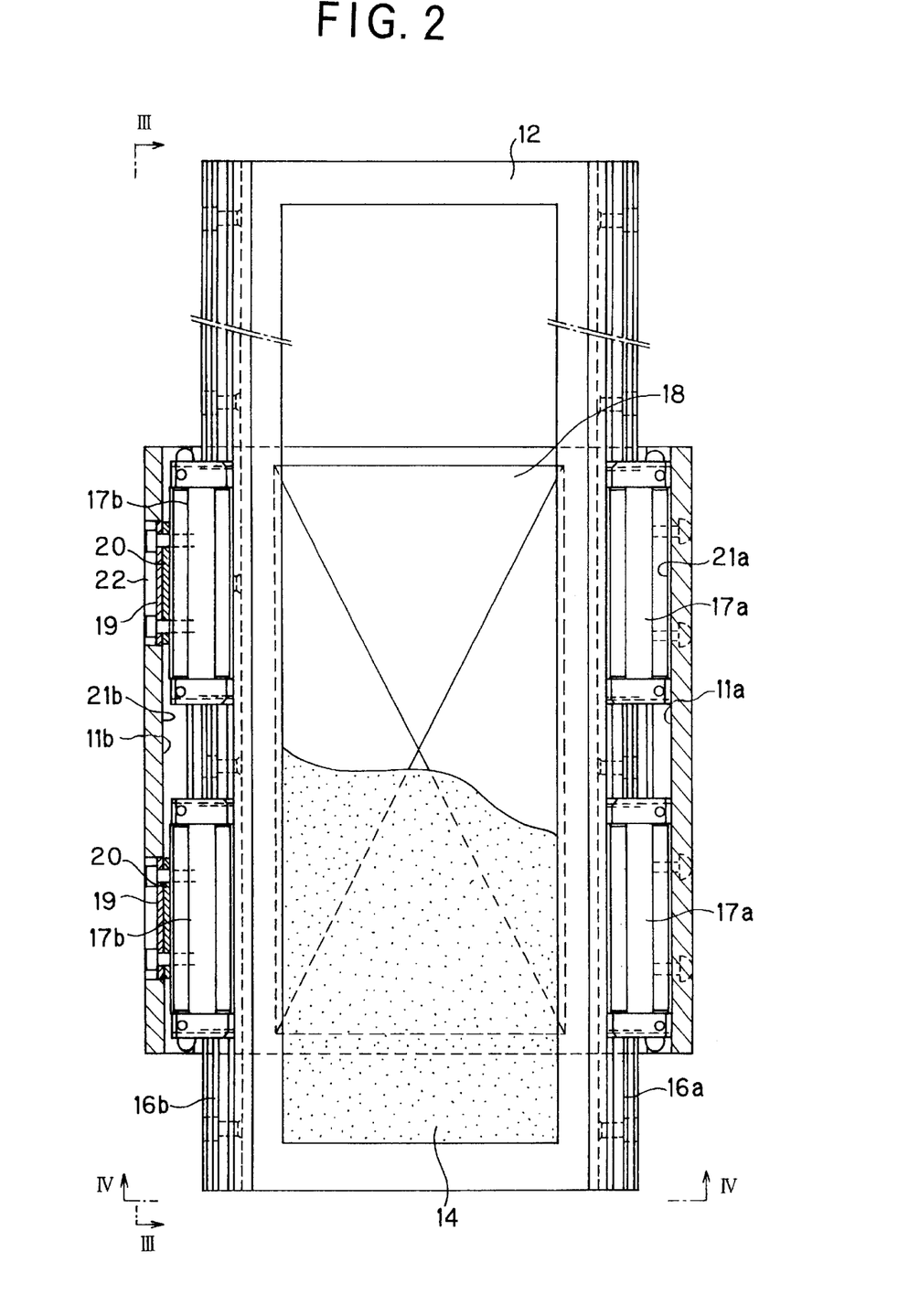
FIG. 2 is a cross sectional view of the apparatus shown in FIG. 1, the cross section being taken in a direction parallel to a movable member of the device.
Figure 3:
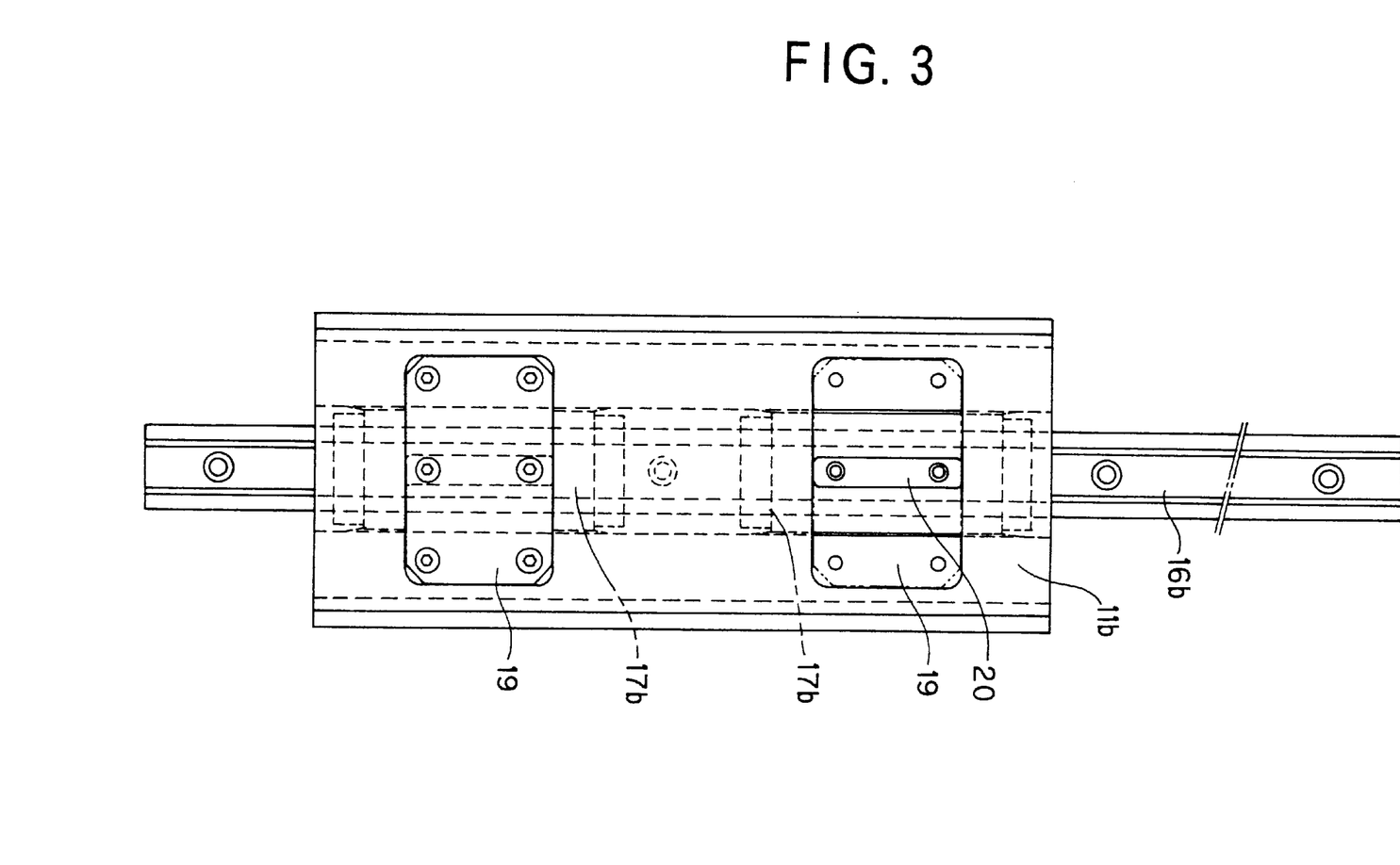
FIG. 3 is a side view of the apparatus of FIG. 2 taken along the line III—III therein.

As shown in FIGS. 2 to 4, the fixed member 11 is formed like a quadrilateral frame. And the movable blocks 17a, 17a, 17b, 17b are attached to the inner wall surfaces 11a, 11b in short sides of the quadrilateral frame. The movable blocks 17a, 17a attached to the inner wall surface 11a does not change the position. And the movable blocks 17b, 17b attached to the inner wall surface 11b are allowed to be movable in a perpendicular direction to the inner wall surface 11b so as to absorb an installation error caused when said the pair of rectilinear guides 13a, 13b are installed, or thermal expansion and contraction difference between the fixed member 11 and the movable member 12.

In the inner wall surface 11a, a fitting groove 21a which has a width equal to the width of the movable blocks 17a, 17a are formed so as to locate the movable blocks 17a, 17a.

The movable blocks 17a, 17b are fitted in the fitting groove 21a and fixed to the inner wall surface 11a. In the inner wall surface 11b, fitting groove 21b is formed by which the rectilinear guide 13b is guided to move in the direction perpendicular to the inner wall surface 11b. The width of the fitting groove 21b is equal to the width of the movable blocks 17b, 17b of the rectilinear guide 13b. The fitting groove 21b has a pair of wall guide surfaces opposing to each other. Being guided by a pair of wall guide surfaces of the fitting groove 21b, movable blocks 17b, 17b move in the perpendicular direction.

The movable blocks 17b, 17b are attached to the inner wall surface 11b of the fixed member 11 through elastic beams 19, 19 as a displacement absorbing device.

As shown in FIG. 4, the elastic beam 19 has both longitudinal end portions fixed to the fixed member 11, the movable block 17b is substantially arranged in the middle of the elastic beam 19 in the longitudinal direction thereof. A hollow 23 which has the same area as the elastic beam 19 is formed on an outer wall surface 22, and the elastic beam 19 is fitted in the hollow 23. The hollow 23 is extended to the fitting groove 21b. A wall is penetrated by the hollow 23 and the fitting groove 21b. The elastic beam 19 has span which is capable of deflection, and the span is longer than the width W of the movable block 17b. And a spacer 20 is arranged between the elastic beam 19 and the movable block 17b so that the elastic beam 19 deflects larger. The spacer 20 has width less than the width of the movable block 17b.

Figure 5:
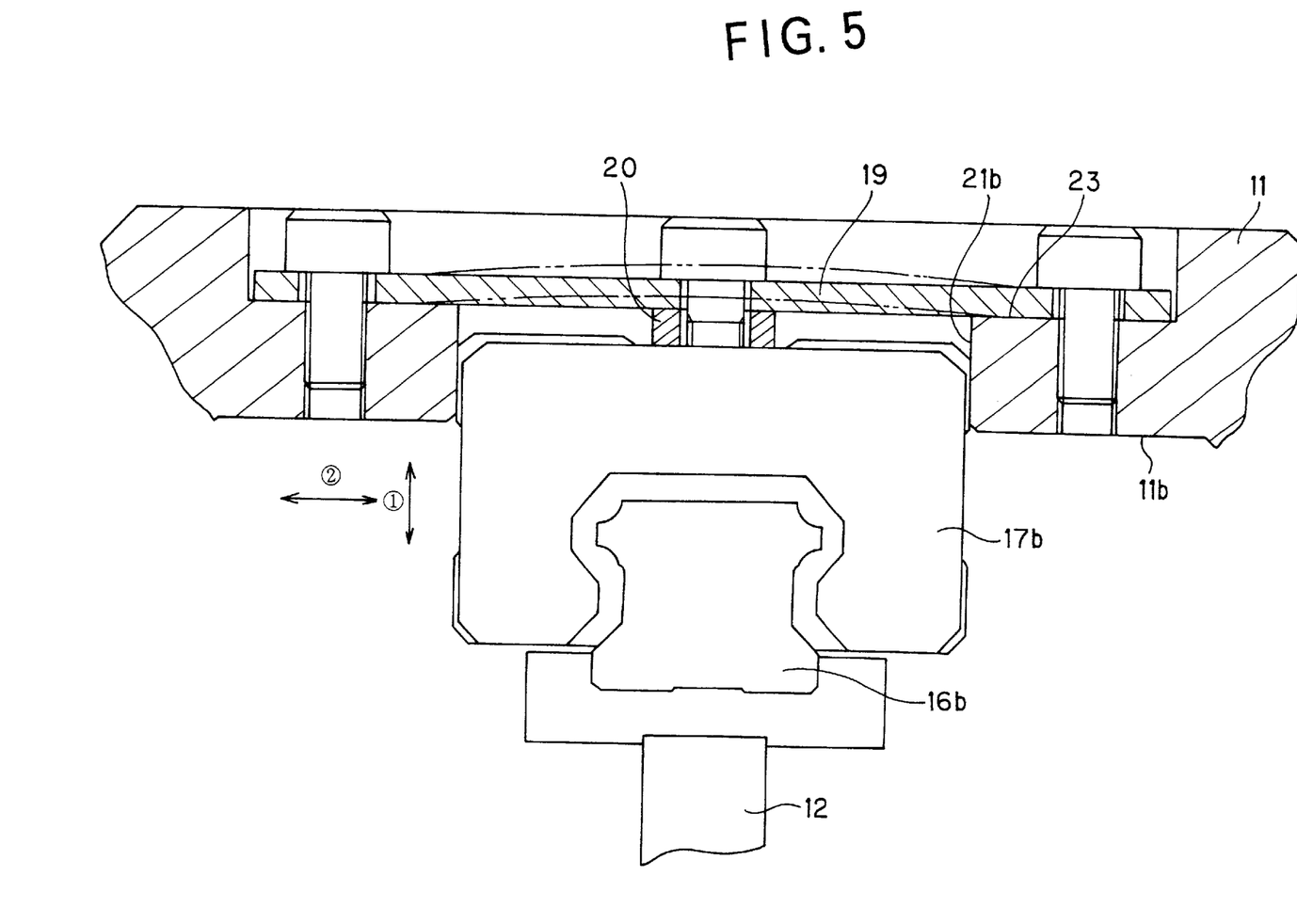
FIG. 5 is a cross sectional view showing the deflection of the elastic beam.

As shown FIG. 5, when a processing error including an installation error caused by the installation of the two rectilinear guides 13a, 13b occurs, or when thermal expansion and contraction difference between the fixed member 11 and the movable member 12 occurs, or when a deformation of the relative linear motion apparatus caused by a load from the inside or the outside of the apparatus occurs, the elastic beam 19 is deflected by a load applied from the spacer 20 to the elastic beam 19. The elastic beam 19 is deflected by the load, as if a fixed beam is deflected by a concentrated load applied to the middle of the fixed beam. Deflecting the elastic beam 19 to the perpendicular direction allows the movable block 17b to move in the perpendicular direction ① and absorbs the installing error or the thermal expansion and contraction difference or the deformation of the relative linear motion apparatus caused by the load. Since the movable block 17b is allowed to move only in the direction ① perpendicular to the inner wall surface 11b and restricted to move in the horizontal direction ②, it is possible to guide the movable member 12 in good rigidity. Further, In this embodiment, since elastic beam 19 is disposed only on the movable block 17b and is not disposed on the movable block 17a, the movable member 12 is stably supported by the rectilinear guides 13a, 13b in the perpendicular direction ①.

In order to absorb the expansion and contraction difference, it is expected that the elastic beam 19 deflect largely. Disposing the spacer between the movable member 17b and the elastic beam 19 the load placed on the elastic beam 19 approaches to the concentrated load from the distributed load, and deflects the elastic beam 19 larger. Furthermore, since the span of the elastic beam 19 is longer than the width W of the movable block 17b, the deflection of the elastic beam 19 becomes all the more larger.

Figure 6:
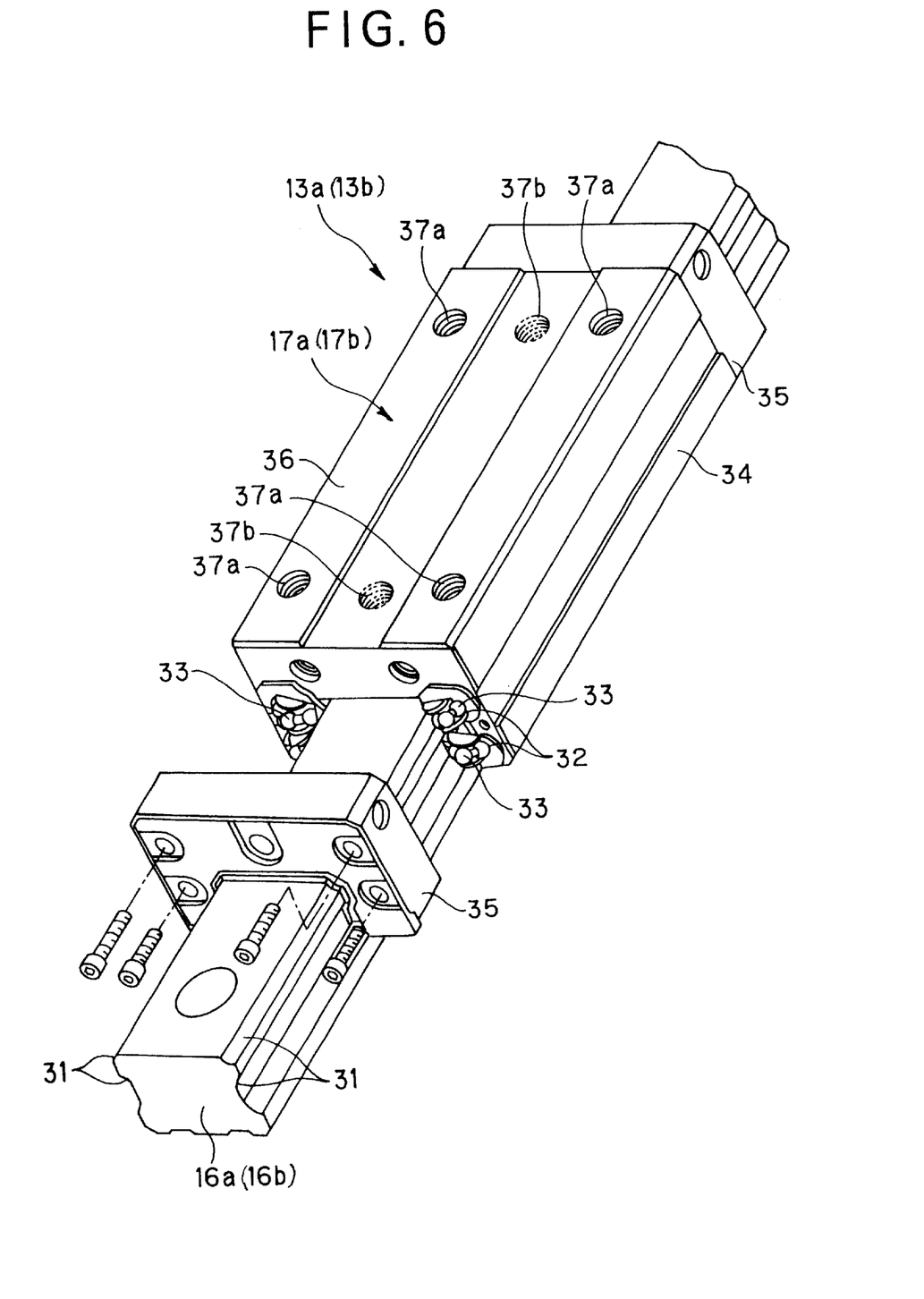
FIG. 6 is perspective view showing a rectilinear guide put in the apparatus.

FIG. 6. Shows the rectilinear guide 13a (13b). The rectilinear guides 13a (13b) comprises, a track rail 16a (16b) as a track member formed with rolling member rolling grooves 31,31 as rolling member rolling surfaces along a longitudinal direction thereof, a movable block 17a (17b) mounted to be relatively movable to the track rail 16a (16b), the movable block 17a (17b) being formed with rolling member circulation passages including loaded rolling member rolling grooves as loaded rolling member rolling surfaces opposing to the rolling member rolling grooves 31,31 of the track rail 16a (16b) when mounted, and a number of balls 33, - - - , 33 as rolling members arranged in the rolling member circulation passages so as to circulate therein in conformity with the relative motion of the movable block 17a (17b) with respect to the track rail 16a (16b). This rectilinear guides 13a (13b) is constructed so as to bear a load not only in the perpendicular direction but also in the horizontal direction.

The track rail 16a (16b) has a rectangular shape in section. Each of the right and left side surfaces of the track rail 16a (16b) is formed with two lines of loaded ball rolling grooves 31,31. And the total of ball rolling grooves 31,31 is four.

The movable block 17a (17b) comprises a body portion 34 and end covers (plates) 35, 35 disposed on both longitudinal end sides of the body portion 34, the body portion 34 and the end covers 35, 35 being secured together by means of bolts. The movable block 17a (17b) straddles the track rail 16a (16b). The movable block 17a (17b) is formed with the loaded ball rolling grooves 32,32 and the ball escape bores, while each of the end plates 35,35 is formed with the direction changing passages. Each of the ball escape bores linearly passes through the movable block 17a (17b). A fixing surface 36 attached to the inner wall surface 11a (11b ) or the spacer 20 is formed on the upper surface of the body portion 34. Four screw holes 37a, - - - , 37a for fixing the inner wall surface 11 a (11 b) are formed around the fixing surface 36, and two screw holes 37b, 37b for fixing the spacer 20 are formed inside the screw holes 37a, - - - , 37a.

The loaded rolling member rolling grooves 32, 32 are opposing to the rolling member rolling grooves 31, 31 of the track rail 16a (16b), and the loaded rolling member rolling grooves 32, 32 and the rolling member rolling grooves 31, 31 compose loaded ball rolling passages. A number of balls (rolling members) 33, - - - , 33 are arranged in the ball circulation passages and are put between the loaded rolling member rolling grooves 32, 32 and the rolling member rolling grooves 31,31. According to the movement of the movable blocks 17a (17b) along the track rail 16a (16b), the balls 33, - - - , 33 are moved (rolled) from one end to the other end of the loaded ball rolling passages and scooped by the direction changing passages of the end plates 35, 35 and guided by the ball escape bores, and then returned to the one end of the loaded ball rolling passages through the other one of the direction changing passages. The balls circulate in conformity with the relative motion of the movable block 17a (17b) with respect to the guide rail 16a (16b).

Figure 7:
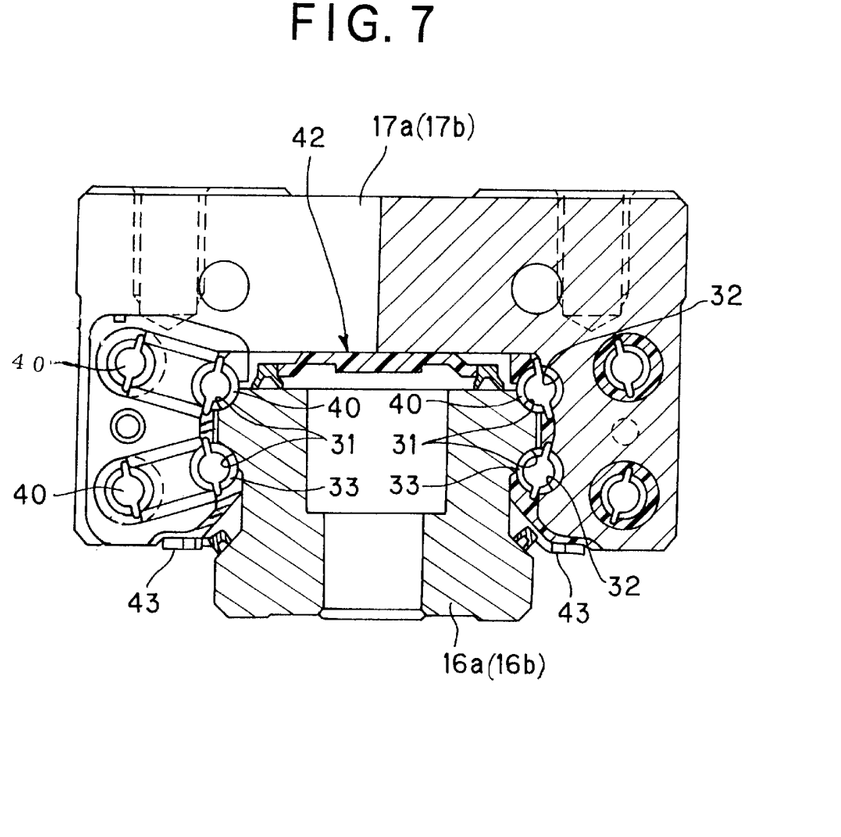
FIG. 7 is a cross sectional view showing the rectilinear guide, the cross section being taken in a direction normal to a track rail of the guide.
Figure 8:
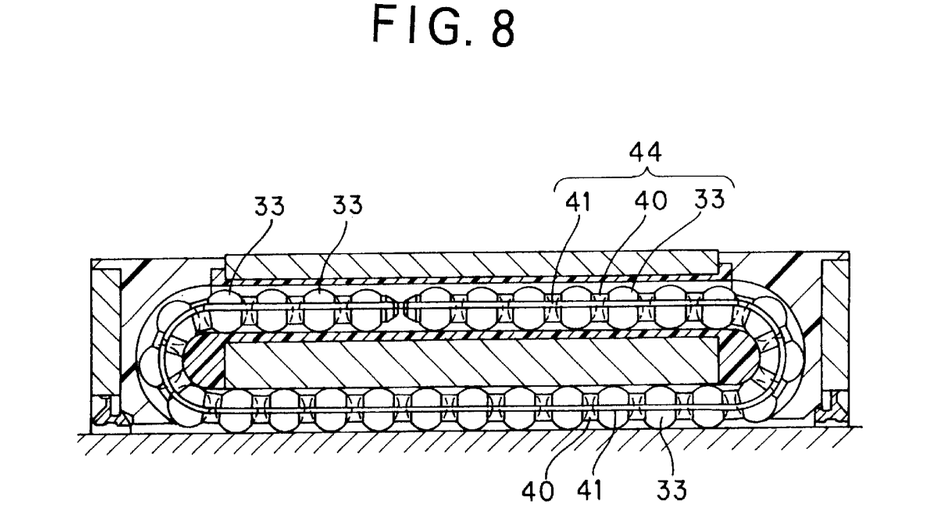
FIG. 8 is a cross sectional view showing a movable block of the rectilinear guide, the cross section being taken in a direction parallel to a track rail of the guide.

As shown in FIGS. 7 to 8, a chain of balls are held capable of rotation and slide by retainer 44. This retainer 44 is composed of a plurality of spacers 40, - - - , 40 interposed alternately between a plurality of balls 33, - - - , 33, and a thin belt 41 connecting the each of the spacers 40, - - - , 40.

A seal member 42 is disposed between the movable block 17a (17b) and a upper surface of track rail 16a (16b). Seal members 43, 43 are disposed between the movable block 17a (17b) and side surfaces of the track rail 16a (16b). This seal members 42, 43, 43 seal lubricating oil filled between the ball rolling grooves 31, 31 and the loaded ball rolling grooves 32, 32.

Figure 9:
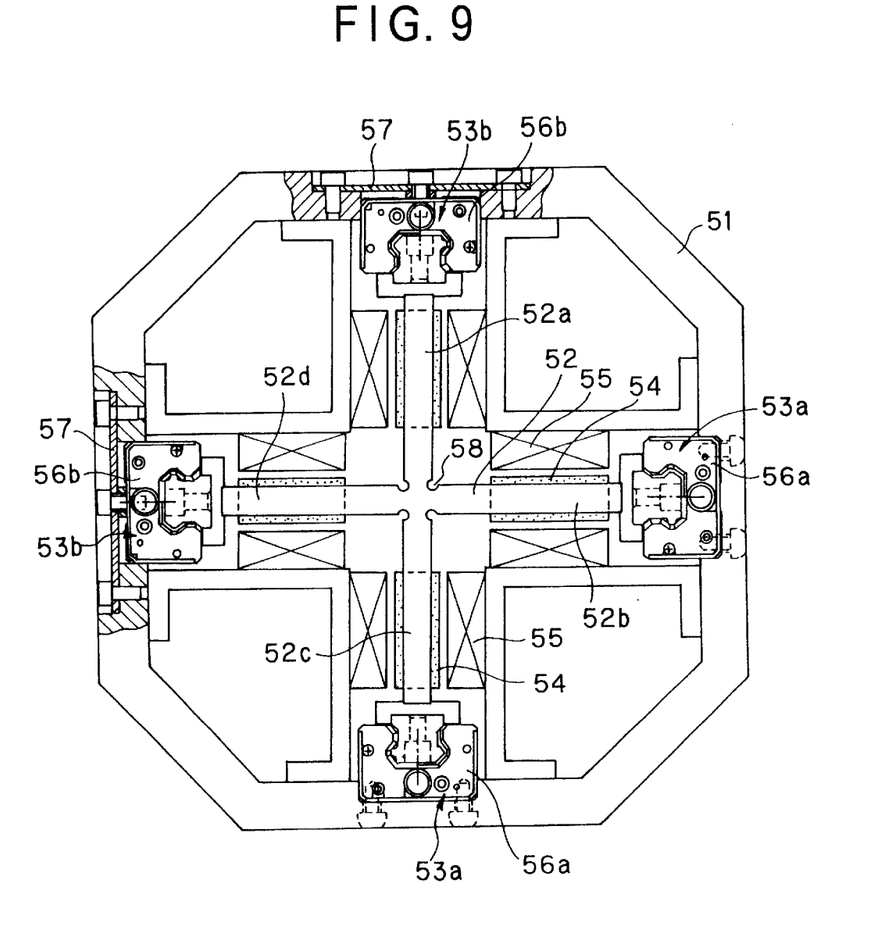
FIG. 9 is a cross sectional view showing a relative linear motion apparatus according to a second embodiment of the present invention, the cross section being taken in a direction normal to a movable member.

FIG. 9 shows a relative linear motion apparatus according to a second embodiment of the present invention. In this embodiment, a fixed member 51 has a octagonal frame in section, a movable member 52 is cross-shaped in section. Four rectilinear guides 53a, 53a, 53b, 53b are disposed between tips of a cross and inner wall surfaces opposing to the tips. Four permanent magnets 54, - - - , 54 are fitted in four plate members 52a, 52b, 52c, 52d composing the cross. And four coils 55, - - - , 55 are attached to the fixed member so that the each of permanent magnets 54, - - - , 54 are put between each of the coils 55, - - - , 55. The movable member 52 is moved by producing a magnetic field of the coils 55, - - - , 55.

In one direction and in other direction crossing to one direction, rectilinear guides 53a, 53a and rectilinear guides 53b, 53b are arranged between the fixed member 51 and the plate members 52a, 52b, 52c, 52d of the movable member 52. As the relative linear motion apparatus according to the first embodiment, movable blocks 56b, 56b are attached to the fixed member 51 through elastic beams 57, 57, and are capable of moving in a direction perpendicular to the inner wall surfaces. Also, these movable blocks 56b, 56b are guided to move only in the direction perpendicular to the inner wall surfaces and restricted to move in a horizontal direction by guide surfaces.

At the crossing part of the movable member 52, notches 58, - - - , 58 are made to reduce a rigidity of the movable member 52 slightly. Since there is a reduction in the rigidity of the crossing part, the crossing part absorbs the displacement caused by the thermal expansion and contraction of the plate members 52a, 52c in one direction or the plate members 52b, 52d in other direction. And a load which is caused by the thermal expansion and contraction of the plate members 52a, 52c is not transmitted to the plate members 52b, 52d. Also, a load which is caused by the thermal expansion and contraction of the plate members 52b, 52d is not transmitted to the plate members 52a, 52c in the same way.

Figure 10:
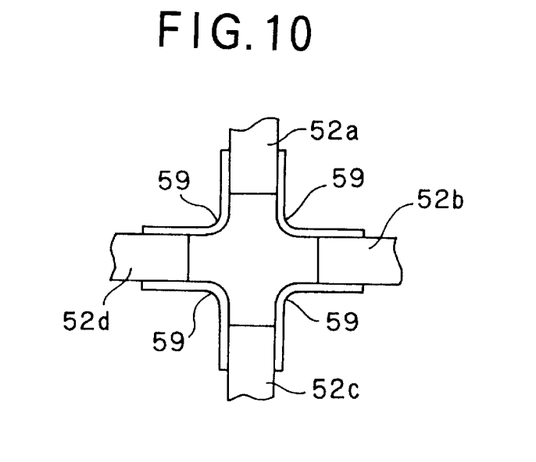
FIG. 10 is a cross sectional view showing another crossing portion of the apparatus in FIG. 9.

FIG. 10 shows another variation of the crossing part. In this variation, four plate members 52a, 52b, 52c, 52d which compose the cross are connected with gussets 59, - - - , 59. The rigidity of gussets 59, - - -, 59 are reduced. In this case, the gussets 59, - - - , 59 absorb the displacement caused by the thermal expansion and contraction of the plate members 52a, 52c in one direction or the plate members 52b, 52d in other direction. And a load which is caused by the thermal expansion and contraction of the plate members 52a, 52c is not transmitted to the plate members 52b, 52d. Also, a load which is caused by the thermal expansion and contraction of the plate members 52b, 52d is not transmitted to the plate members 52a, 52c in the same way.

In this embodiment, making the movable member in the shape of the cross give good rigidity to the movable member 52 itself. Also, since an area of the coils 55, - - - , 55 and the permanent magnets 54, - - - , 54 become larger, an output of the primary drive become larger.

Further, in the described embodiment of the relative linear motion apparatus, the elastic beam 57 is arranged on only one side of the rectilinear guides 53a, 53b opposing to each other so that only one side of the rectilinear guides 53a, 53b moves in the perpendicular direction. However, in an alternation, it may be adopted that the elastic beams 57, 57 are arranged on both rectilinear guides 53a, 53b so that both sides of the rectilinear guides 53a, 53b move in the perpendicular direction.

Further, in the described embodiment of the relative linear motion apparatus, the elastic beams (plate) 57 are attached to the fixed member 51. However, in an alternation, it may be adopted that the elastic beam 57, 57 are attached to the movable member 52.

Still furthermore, the shape of the fixed member 51 in cross section is not restricted to a quadrilateral or an octagon, and alternations and many other changes such as a polygon or a circle or a substantially ⊐-shaped cross section of which one side is opened may be adopted. As to the movable member 52, the shape of the movable member 52 in cross section is not restricted to a plate or an crossing which miniaturize the relative linear motion apparatus, and alternations and many other changes such as a cylinder may be adopted.

Figure 11:
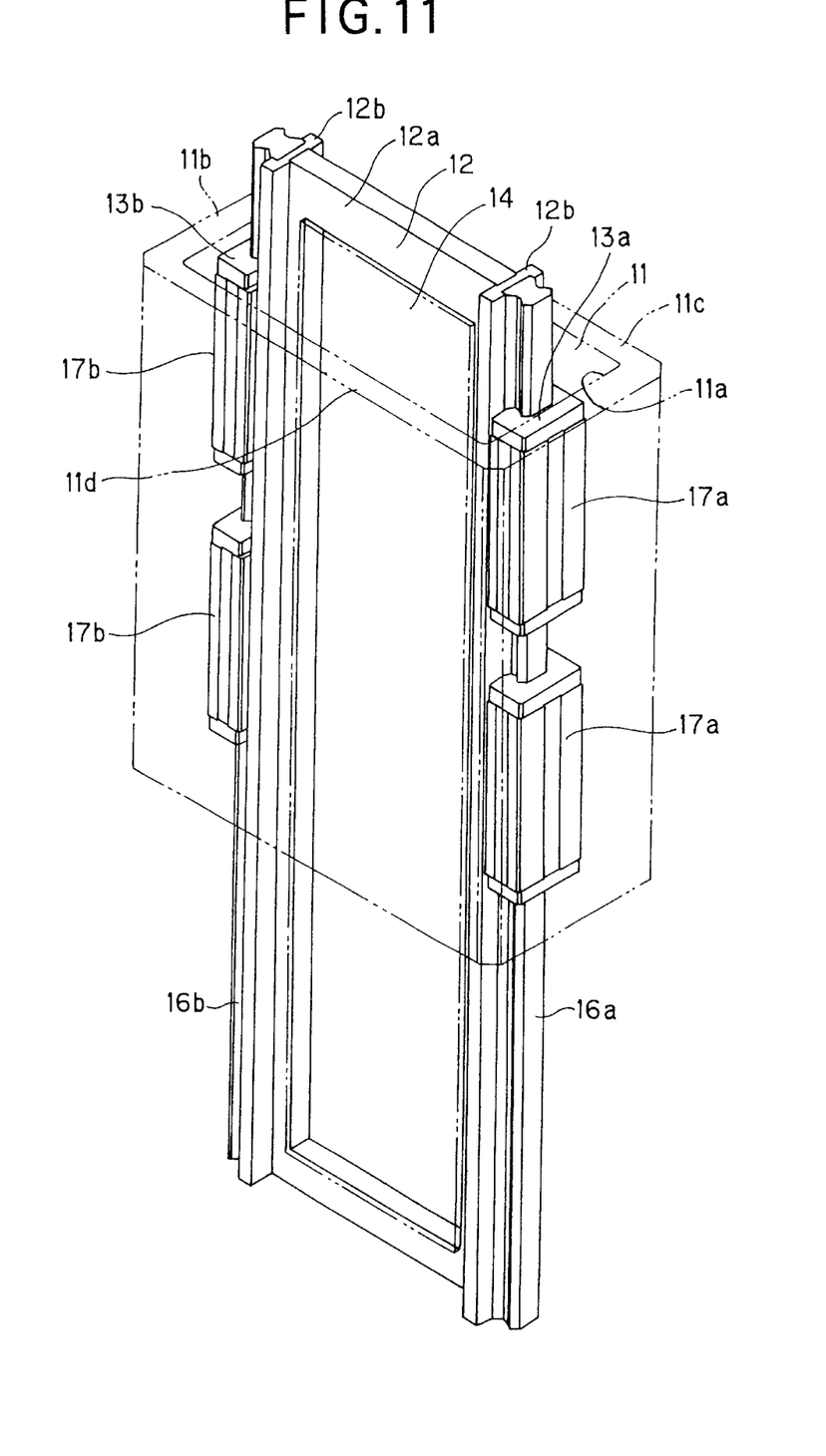
FIG. 11 is a perspective view showing a relative linear motion apparatus according to a third embodiment of the present invention.
Figure 12:
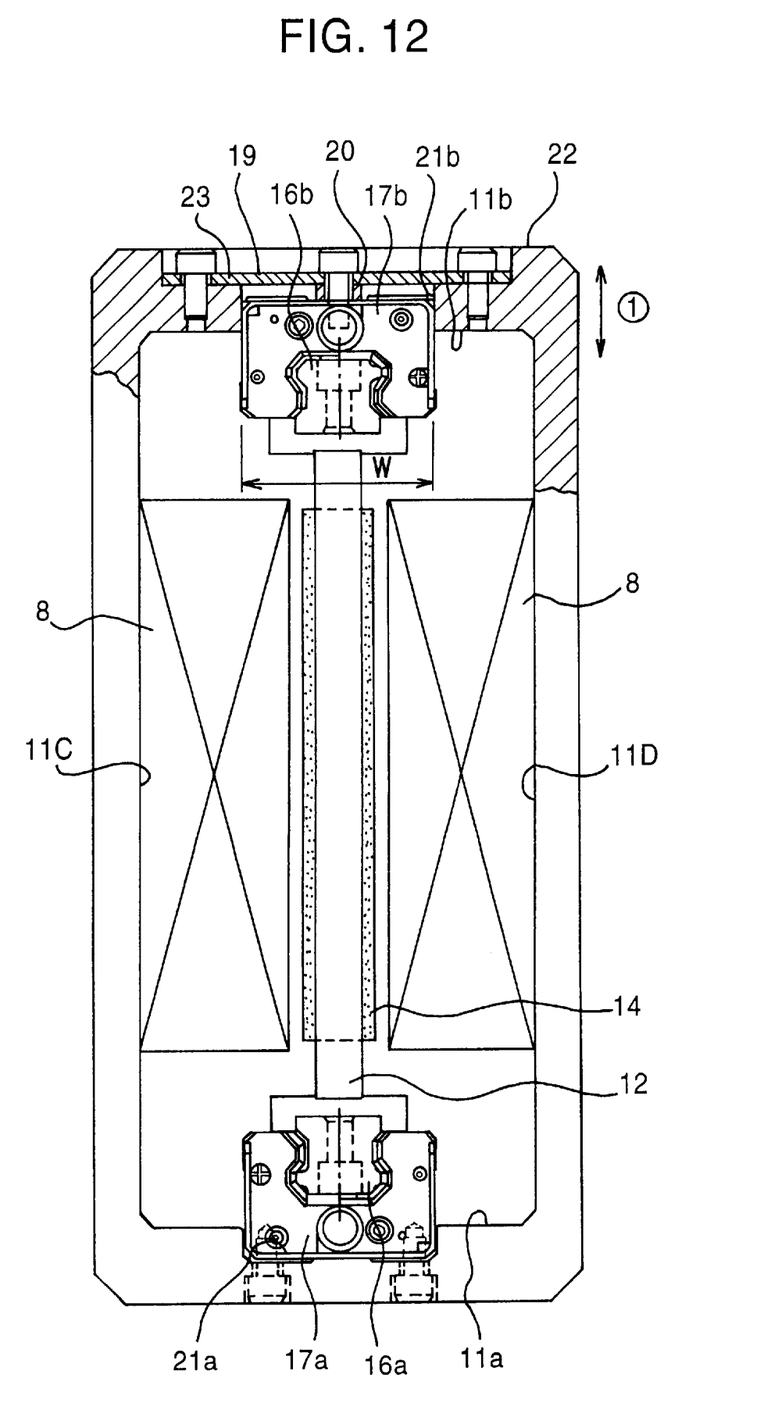
FIG. 12 is a plan view of the apparatus in FIG. 11, partially in section.
Figure 13:
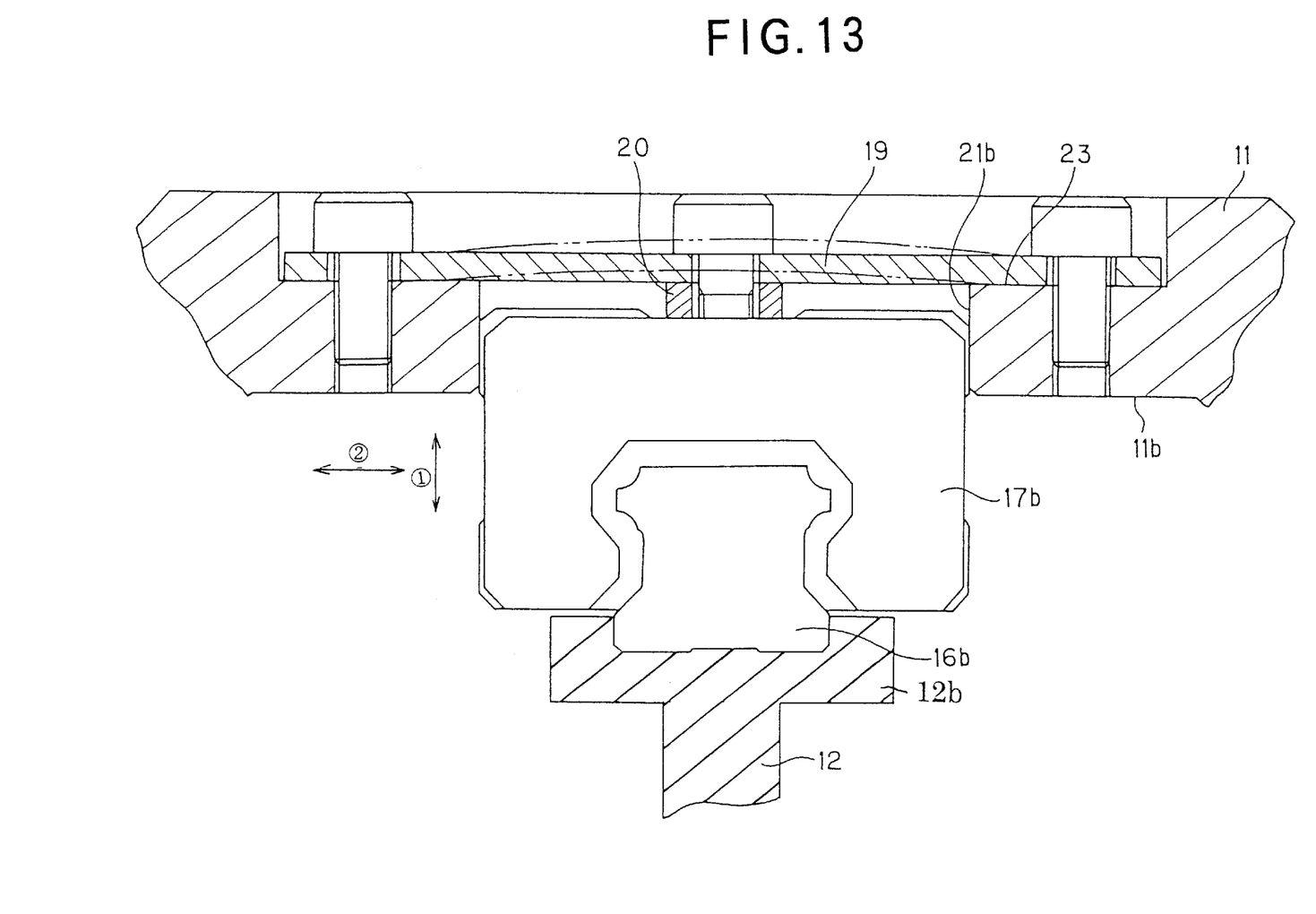
FIG. 13 is a cross sectional view showing a combination of a movable member and a track rail of the apparatus in FIG. 11.

FIGS. 11 to 13 show a relative linear motion apparatus according to a third embodiment of the present invention. In this embodiment, the relative linear motion apparatus comprises a fixed member 11 formed like a quadrilateral frame as first structure, movable member 12 arranged between a pair of inner wall surfaces 11a 11b in short sides of the quadrilateral frame as second structure, the movable member 12 being formed like a plate as a second structure, and a pair of rectilinear guides 13a, 13b arranged between each of the inner wall surfaces 11a, 11b and each of both edges of the movable member 12. The movable member 12 slides relative to the inner wall surfaces 11a, 11b in a direction parallel to the inner wall surfaces 11a, 11b.

Each of the rectilinear guides 13a, 13b comprises the track rail 16a (16b) as a track member, and the movable block 17a (17b) as slide member. Each of the track rails 16a, 16b is arranged on each of both edges of the movable member 12. And the movable blocks 17a, 17a, 17b, 17b are arranged on the inner wall surfaces 11a, 11b of fixed member 11. The movable blocks 17a, 17a are attached to the inner wall surface 11a, and the movable blocks 17b, 17b are attached to the inner wall surface 11b. And the movable blocks 17b, 17b are set to be movable only in the direction perpendicular to the inner wall surface 11b so as to absorb the installing error of the rectilinear guides 13a, 13b or the thermal expansion and construction difference between fixed member 11 and movable member 12.

The arrangements and functions of elements or parts of the relative linear motion apparatus the same as the relative linear motion apparatus shown in FIGS. 1 to 6 are not described herein by adding the same reference numerals to the corresponding elements or parts.

The frame 12a and rail holding portions 12b, 12b fixed to the both edges of the frame 12a are integrally formed by a die casting using metal such as aluminum. Further, the track rails 16a, 16b are inserted in rail holding portions 12b, 12b of the movable member 12, and are integrally molded with movable member 12. In different words, the movable member 12 is integrally formed with the track rails 16a, 16b by injecting metal such as aluminum into a metal mold in which the track rails 16a, 16b are placed, i.e. through a so-called insert molding method. Since the track rails 16a, 16b are affected by heat when the track rails 16a, 16b are molded, the ball rolling grooves 31,31 are formed by machining or grinder after molding the track rails 16a, 16b. Also, it may be possible to arrange a means for preventing the track rails 16a, 16b from slipping out of the rail holding portions 12b, 12b to the axial direction of the track rails 16a 16b. And forming a difference in level on the track rails 16a 16b prevents the track rails 16a, 16b from slipping out of the rail holding portions 12b, 12b.

When movable member 12 are arranged between the pair of inner wall surfaces 11a, 11b opposing to each other of the fixed member 11 through the rectilinear guides 13a, 13b, it is necessary to reduce the processing error including the installing error of the rectilinear guides 13a, 13b. According to this embodiment, since the track rails 16a, 16b are inserted in the movable member 12 and are integrally molded with the movable member 12, it is possible to reduce the processing error as much as possible. Also it is possible to reduce the number of articles.

Figure 14A:
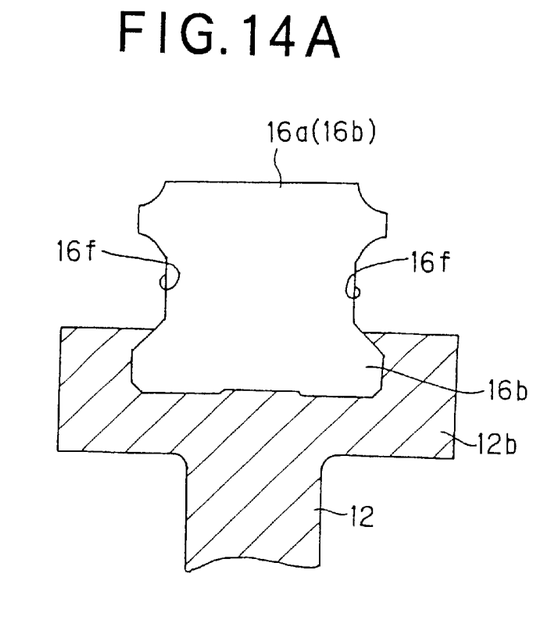

FIG. 14 shows a variation of the point in the third embodiment. As shown in FIG. 14(a), the rail holding portion 12b of the movable member 12 is extended from a base of the track rail 16a (16b) to hollows 16f, 16f formed on side surfaces of the track rail 16a (16b). A lower part of the track rail 16a (16b) is wrapped by the rail holding portion 12b. According to this construction, since combination of the track rail 16a (16b) and the rail holding portion 12b becomes firmer, both are not separated by added vibration or shock.

Figure 14B:
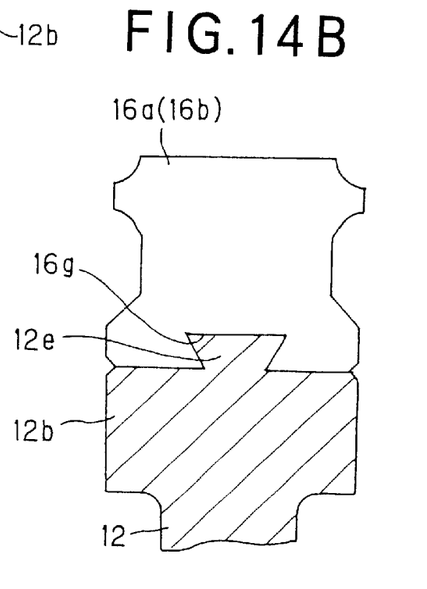

In a second variation shown in FIG. 14(b), a dovetail groove 16g is formed on the base of the track rail 16a (16b), a part 12e of the rail holding portion 12b is injected into the dovetail groove 16g. According to this structure, combination of the track rail 16a (16b) and the rail holding portion 12b becomes firmer as much as the variation shown in FIG. 14(a). Also, it is possible to narrow down the width of the rail holding portion 12b to the width of the track rail 16a (16b) and to miniaturize the relative linear motion apparatus.

Figure 14C:
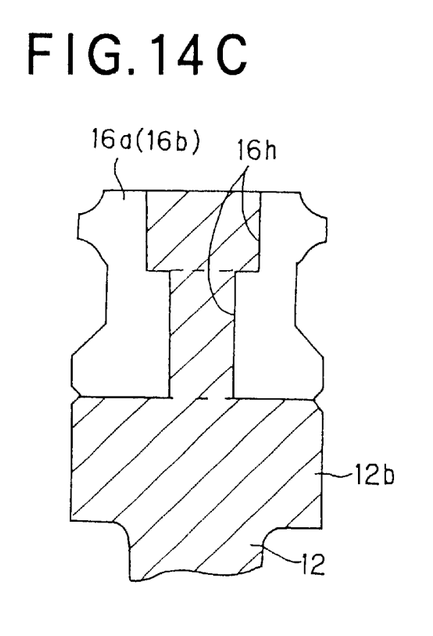

In a third variation shown in FIG. 14(c), a part 12f of the rail holding portion 12b is injected into bore 16 for inserting bolt. According to this structure, combination of the track rail 16a (16b) and the rail holding portion 12b becomes firmer as much as the variations shown in FIG. 14(a) and FIG. 14(b). And it is possible to narrow down the width of the rail holding portion to the width of the track rail 16a (16b). Furthermore since the existing bore 16h for inserting bolt is used for casting, it is not necessary to form the dovetail groove 16g shown in FIG. 14(b) on the track rail 16a (16b), and as a result costs fall.

It is further to be noted that the present invention is not limited to the described embodiments and alternations and many other changes and modifications may be made without departing from the scopes of the appended claims.

What is claimed is:

1. A relative linear motion apparatus comprising:
    a first structure having at least a pair of inner wall surfaces opposing to each other;
    a second structure arranged between the a pair of inner wall surfaces, the second structure being movable in linear motion relative to the first structure;
    at least two rectilinear guides arranged between the pair of inner wall surfaces of the first structure and the second structure; and
    a displacement absorbing device arranged on at least one of the first structure and the second structure so as to allow at least one of the two rectilinear guides to move in an intersecting direction against the wall surfaces.

2. A relative linear motion apparatus according to claim 1, wherein said at least one of the two rectilinear guides moves in the intersecting direction against the wall surfaces due to a processing error including an installation error caused when said at least one of the two rectilinear guides is installed or thermal expansion and contraction difference between the first structure and the second structure.

3. A relative linear motion apparatus according to claim 1 or 2, wherein said displacement absorbing device is arranged between (i) one of said first structure and said second structure (ii) and one of said two rectilinear guides, and said displacement absorbing device having an elastic beam which can deflect toward the intersecting direction against the wall surfaces.

4. A relative linear motion apparatus according to claim 3, wherein said elastic beam has span that is capable of deflection, and the span is longer than the width of said one of the two rectilinear guides.

5. A relative linear motion apparatus according to claim 4, wherein a spacer is arranged between said elastic beam and one of said rectilinear guides so that said elastic beam deflects larger, and the spacer having width less than the width of said one of the two rectilinear guides.

6. A relative linear motion apparatus according to claim 4, wherein said elastic beam has both longitudinal end portions fixed to said first structure or said second structure, and said one of the two rectilinear guides is substantially arranged in the middle of said elastic beam in a longitudinal direction thereof.

7. A relative linear motion apparatus according to claim 1, wherein said first structure or said second structure has guide surfaces which guide said one of the two rectilinear guides to move in the intersecting direction against the wall surfaces.

8. A relative linear motion apparatus according to claim 7, wherein said guide surfaces, being formed on fitting groove of which the width is equal to the width of said one of the two rectilinear guides, allow said one of the two rectilinear guides to move only in a perpendicular direction to the wall surfaces without occurrence of change in posture of said one of the two rectilinear guides.

9. A relative linear motion apparatus according to claim 1, wherein each of said rectilinear guides comprises:
  a track member formed with a rolling member rolling surface along a longitudinal direction;
  a movable block mounted to be relatively movable to the track member formed with a rolling member circulation passage including a loaded rolling member rolling surface opposing to the rolling member rolling surface of the track member when mounted; and
  a number of rolling members arranged in the rolling member circulation passage so as to circulate therein in conformity with the relative motion of the movable block with respect to the track rail.

10. A relative linear motion apparatus according to claim 9, wherein each of movable blocks is fixed to said each of said inner wall surfaces of said first structure, and each of track members is fixed to each of edges of said second structure.

11. A relative linear motion apparatus comprising:
  a first structure having at least a pair of inner wall surfaces opposing to each other;
  a second structure arranged between the pair of inner wall surfaces, the second structure being movable in linear motion relative to the first structure;
  at least two rectilinear guides arranged between the first structure and the second structure; and
  a displacement absorbing device arranged on at least one of the first structure and the second structure so as to allow at least one of the two rectilinear guides to move in an intersecting direction against the wall surfaces;
  wherein said displacement absorbing device is arranged between (i) one of said first structure and said second structure (ii) and one of said two rectilinear guides, said displacement absorbing device having an elastic beam which can deflect toward the intersecting direction against the wall surfaces,
  and wherein said elastic beam has a span which is capable of deflection, and the span is longer than the width of said one of the two rectilinear guides.

12. A relative linear motion apparatus according to claim 11, wherein a spacer is arranged between said elastic beam and said one of the two rectilinear guides so that said elastic beam deflects larger, and the spacer having width less than the width of said one of the two rectilinear guides.

13. A relative linear motion apparatus according to claim 11, wherein said elastic beam has both longitudinal end portions fixed to said first structure or said second structure, and said one of the two rectilinear guides is substantially arranged in the middle of said elastic beam in a longitudinal direction thereof.

14. A relative linear motion apparatus comprising:
  a first structure having at least a pair of inner wall surfaces opposing to each other;
  a second structure arranged between the pair of inner wall surfaces, the second structure being movable in linear motion relative to the first structure;
  at least two rectilinear guides arranged between the first structure and the second structure; and
  a displacement absorbing device arranged on at least one of the first structure and the second structure so as to allow at least one of the two rectilinear guides to move in an intersecting direction against the wall surfaces;
  wherein each of said rectilinear guides comprises:
    a track member formed with a rolling member rolling surface along a longitudinal direction;
    a movable block mounted to be relatively movable to the track member formed with a rolling member circulation passage including a loaded rolling member rolling surface opposing to the rolling member rolling surface of the track member when mounted; and
    a number of rolling members arranged in the rolling member circulation passage so as to circulate therein in conformity with the relative motion of the movable block with respect to the track rail;
  wherein each of said movable blocks is fixed to each of said inner wall surfaces of said first structure, and each track member is fixed to each of edges of said second structure, and wherein said track member is integrally formed with said second structure by an inserting mold.

15. A relative linear motion apparatus comprising:
  a first structure having at least a pair of inner wall surfaces opposing to each other;
  a second structure arranged between the pair of inner wall surfaces, the second structure being movable in linear motion relative to the first structure;
  at least two rectilinear guides arranged between the pair of inner wall surfaces of the first structure and the second structure; and
  a displacement absorbing device arranged on at least one of the first structure and the second structure, said displacement absorbing device comprising a span that is capable of deflection supported by at least two supports connected to one of said first structure and said second structure, and further wherein said span bends in response to contact from an opposing force from the other of said first structure and said second structure so as to allow at least one of the two rectilinear guides to move in an intersecting direction against the wall surface.

* * * * *